CIRCUIT-RESTORING MEANS FOR TELEPHONE EQUIPMENT

Filed Jan. 15, 1968 2 Sheets-Sheet 1

INVENTORS
JIM C. GARRETT
ROBERT H. JOHNSON
JACK SHELTON
BY Hyman Jackman
ATTORNEY

CIRCUIT-RESTORING MEANS FOR TELEPHONE EQUIPMENT

Filed Jan. 15, 1968 2 Sheets-Sheet 2

INVENTORS
JIM C. GARRETT
ROBERT H. JOHNSON
JACK SHELTON
BY Hyman Jackman
ATTORNEY United States Patent Office 3,536,848
Patented Oct. 27, 1970

3,536,848

CIRCUIT-RESTORING MEANS FOR TELEPHONE EQUIPMENT

Jim C. Garrett, Long Beach, Robert H. Johnson, Marina Del Rey, and Jack Shelton, Long Beach, Calif. (all of 3300 E. Spring St., Long Beach, Calif. 90806)

Filed Jan. 15, 1968, Ser. No. 697,939
Int. Cl. H04m *3/00*
U.S. Cl. 179—18 6 Claims

ABSTRACT OF THE DISCLOSURE

Means comprising a clip for connection to terminals of a block connected to telephone subscribers' lines, a battery and ground plug, and a unit adapted for magnetic mounting on any ferrous portions of a line-finder bay in which said block is installed and which houses a relay switch and lamp connected in circuit with said plug and clip and through the latter to the terminals of a subscriber's line which, for whatever reason, is in non-operating condition.

BACKGROUND OF THE INVENTION

Central office installations for a predetermined number of subscribers, have their telephones connected through Strowger or other stepping switches to banks of terminals, connected to outgoing lines which are similarly connected to telephones of other subscribers and to long-distance telephones. A call instituted at one phone may be completed only through one of the banks of said terminals that is not in use. If all the lines, either at the outgoing or the incoming centrals, are in use, no further calls can be completed. At least one line at each central must be open so a call may be completed. It is important, therefore, to maintain lines or circuits ready for use for proper calls and to avoid, as much as possible, rendering of circuits non-operative due to receivers off the hook, coins stuck in pay station phones, and other circuit tie-ups, both accidental and deliberate.

In large centrals, expensive automatic installations are provided for restoring such non-operative circuits to a condition of availability when called upon. In areas where the number of subscribers is relatively low, such expensive equipment is impractical due to expense of installation and upkeep.

The present simple and inexpensive means is provided for inexpensively restoring circuits that have been rendered inoperative under the following conditions and situations:

Freeing line-finders and selectors that are tied up by receivers off the hook;

Freeing lines serving pay stations with stuck coins;

Giving indication when the subscriber corrects an off-the-hook condition;

Enabling the subscriber to use his phone at any time;

Eliminating a potential trouble report;

Providing an identifying reading to the test board;

Facilitating bay mounting;

Restoring service when wet or otherwise damaged cables are present in the equipment;

Capable of being connected to terminals of either the soldered or wire-wrap type.

In addition to the foregoing features, the present invention has for an object to provide means useful in the line-finder bay of central office equipment, the same only requiring connection to battery and ground, clip-on connection to the terminals of a line that, for whatever reason, is out of use, and having a magnetic mount on any portion of the bay that is adjacent to said terminals.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawings merely show, and the following description merely describes, one embodiment of the present invention, which is given by way of illustration or example only.

SUMMARY OF THE INVENTION

The present circuit-restoring means is adapted to have clip-on connection to selected terminal lugs 10 of a terminal block 11 magnetically mounted as on any ferrous portion or elements of a line-finder bay 12, for instance, the line cut-off relays 13 arranged, in some central office equipment, in stacked relation, as shown in the drawings, and connected to battery and ground for providing operating D.C. and which are provided in central office installations.

The invention comprises, generally, a unit 15 provided with magnetic means 16 for separable mounting connection onto the mentioned ferrous portions 13 of the line-finder bay 12, said unit housing a D.C. relay 17 and mounting a pushbutton switch 18 and a telltale light 19, an electric circuit 20 for said relay, switch and lamp, a battery and ground plug 21 connected by a length of conductor cord 22, and a terminal clip 23 adapted for clip-on connection to three terminals 10 of the terminal block 11 and, therefore, to a subscriber's line, which is permanent T, R and C on either wire-wrap terminal lugs 24 or solder terminal lugs 25, said clip 23 being connected by a length of three-conductor cord 26 to terminals of said relay 17.

BRIEF DESCRIPTION OF THE DRAWINGS

In the drawings, like reference numerals designate similar parts in the several views.

DESCRIPTION OF THE PREFERRED EMBODIMENT

Figures 1, 3:
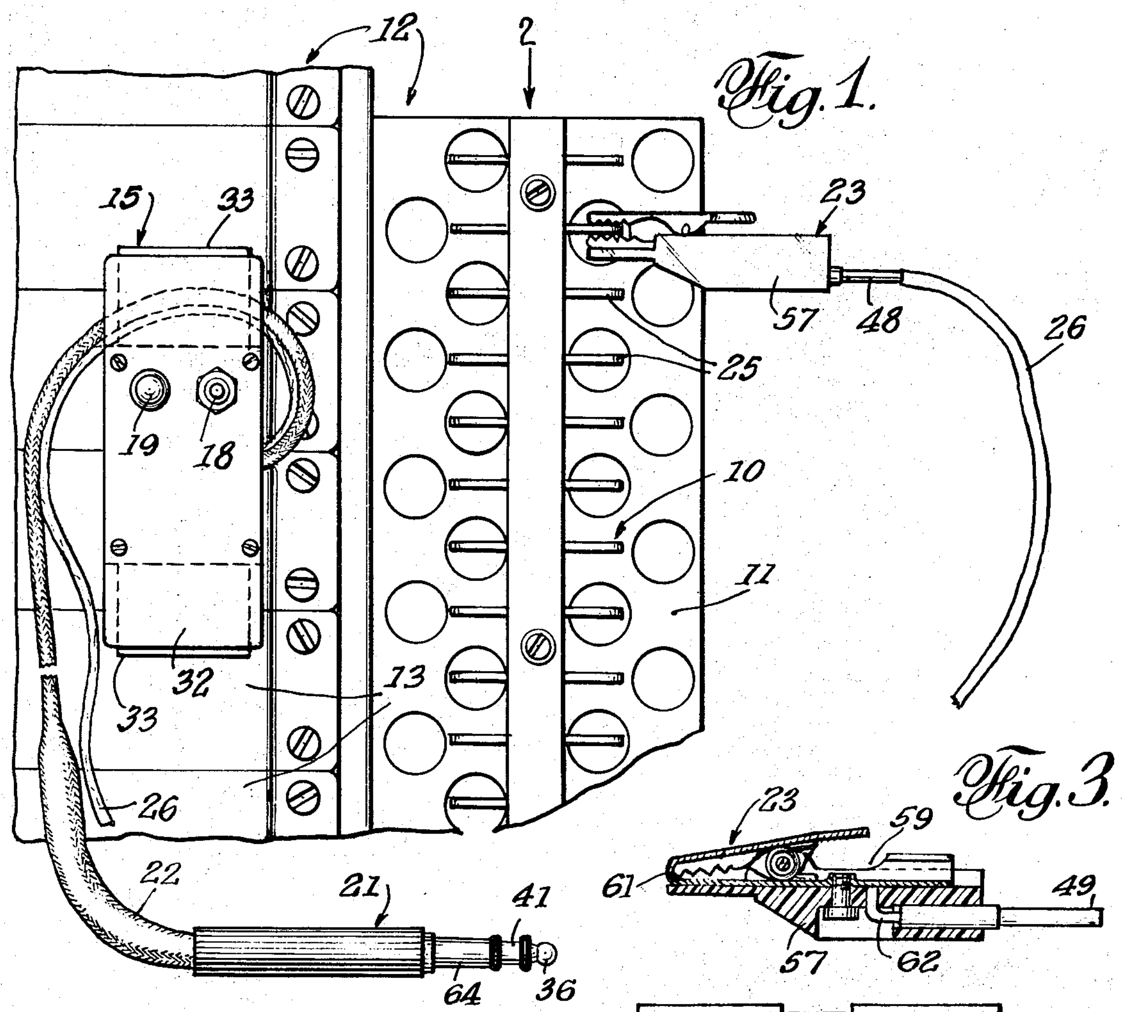
FIG. 1 is a fragmentary front view of a line-finder bay of central office telephone equipment, showing an exemplary installation of a preferred form of circuit-restoring means.
FIG. 3 is a longitudinal sectional view of a terminal clip forming a component of said circuit-restoring means.

The unit 15 is shown as a dielectric housing 30 to contain and/or mount the relay 17, switch 18 and lamp 19. The same has a forward extension 31 that is closed by a plate 32 on which said switch and lamp are mounted.

The magnetic means 16, in the form of permanent magnets, are mounted in upper and lower non-magnetic extensions 33 on the ends of the housing 30, said extensions 33 and the plate 32 cooperating with the extension 31 of said housing to form a cleat on which the cords 22 and 26 are adapted to be wound for neat storage when the present means is not in use. It is to be understood that the bay "iron" on which the unit 15 is to be mounted may take many forms. In the one shown in FIG. 1, the forward surfaces of line cut-off relays comprise the "iron" for engaging the magnetic means 16. Thus, said means 16 may be formed and arranged according to the "iron" the same is to engage for mounting of the unit 15. The position of the unit 15 in or on the bay 12 may vary provided, however, that the lengths of the cords 22 and 26 permit of the plug 21 being placed in connection with battery and ground and the clip 23 being connected to the terminals 10 of that subscriber's line that is to be restored.

The relay 17 preferably has a 2.5K winding 34 at 48 v. and controls spring pile-ups or banks of contacts 35. The push-button switch 18 is of momentary contact type, being closed only when its button is pushed. The light 19 is typical and operates on battery voltage (48 v.).

The circuit 20, beginning with the tip 36 of the plug 21 which connects to battery, and following conductor 37 to relay coil 34, continues along conductor 38 to one side of the switch 18. The other side of said switch is connected to a conductor 39, in which a 600-ohm resistor 40 is provided, said latter conconductor extending to the ring 41 of said plug and which connects to ground. The latter side of the switch 18 is connected by a lead 42 to a spring 43 of the relay contacts 35.

The lamp 19 is connected by a lead 44 to the battery tip 36 and, through normally-engaged contacts 45 and 46, through leads 44 and 47 to the ground ring 41 of the plug 21.

The clip 23 has three terminals 48, 49 and 50 which, as will later be described, are adapted to connect to a subscriber's line which is permanent T, R and C on either wire-wrap or solder terminals. The terminal 48, by a lead 51, is connected to a spring contact 52 of the relay 17 normally spaced from the contact 46. The clip terminal 49, by a lead 53, is connected to a terminal 54 of the relay 17. The clip terminal 50, by a lead 55, is connected to a relay terminal 56.

Figure 2:
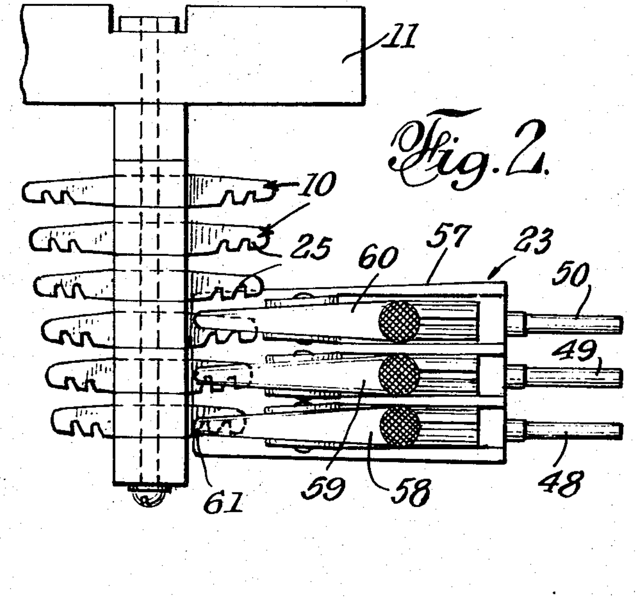
FIG. 2 is an enlarged and partly broken top plan view as seen in the direction of the arrow 2 of FIG. 1.
Figure 4:
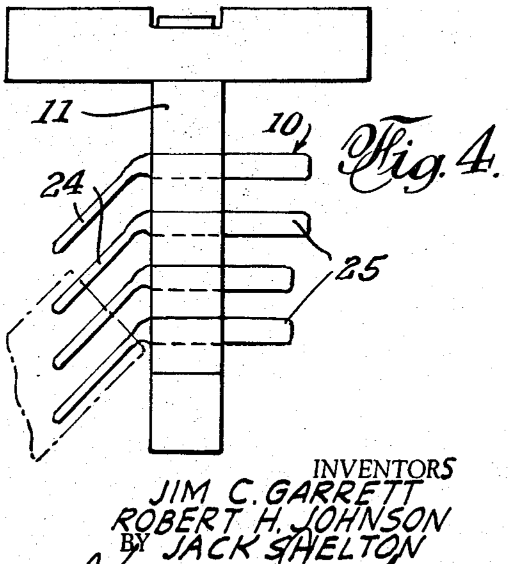
FIG. 4 is a top plan view of another form of the line-finder terminal block as shown in FIGS. 1 and 2.
Figures 5, 6:
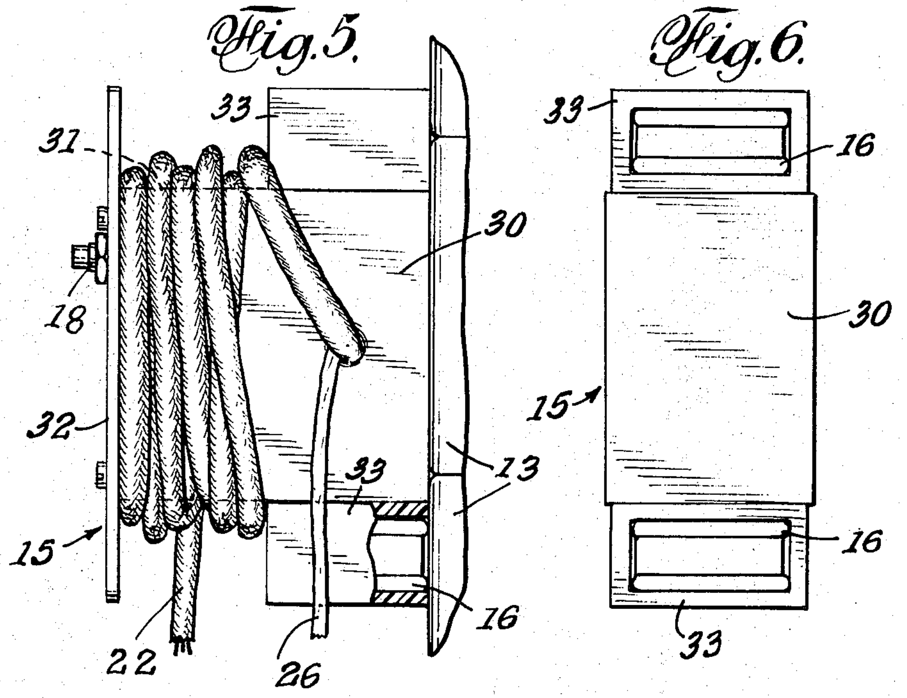
FIG. 5 is a side view of a relay, switch and lamp unit shown in FIG. 1 in front view.
FIG. 6 is a rear view of said unit.
Figure 7:
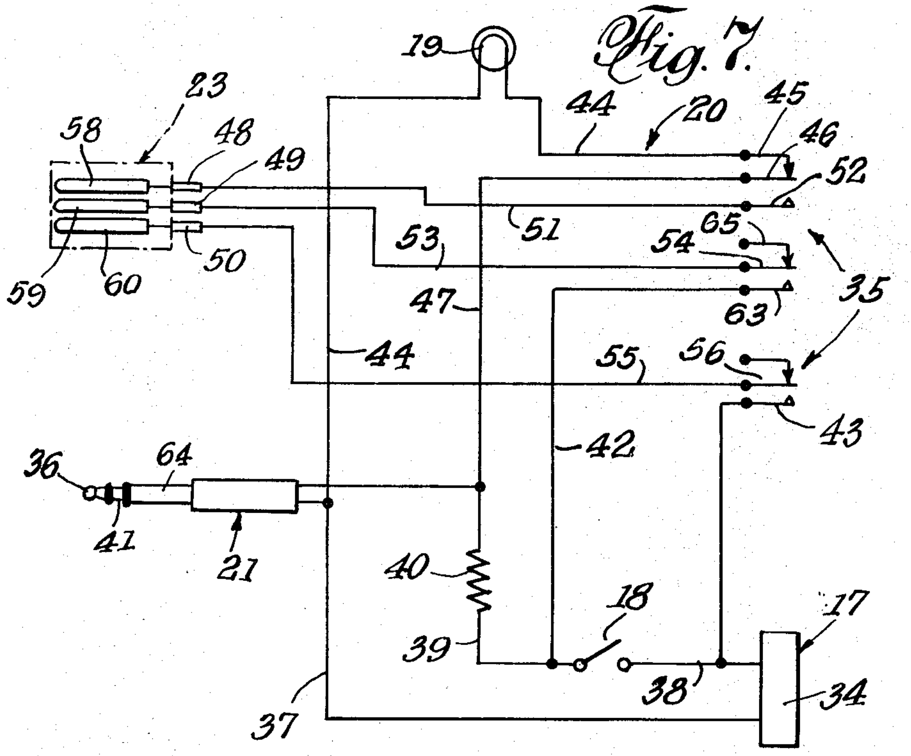
FIG. 7 is a wiring diagram of the electrical components contained in the mentioned unit and shown in circuit with a terminal clip and with a battery and ground plug.

The terminal clip 23 is provided with a dielectric body 57, and a set of three metallic clip terminals 58, 59 and 60 that are spaced according to the normal spacing of the terminal lugs 10 on the blocks 11 and are provided with gripper ends 61 adapted for both physical and electrical separable engagement with said terminal lugs 10, as shown in FIG. 2. The mentioned terminals 48, 49 and 50 extend from the end of the body 57 in general respective alignment with the clip units 58, 59 and 60. Said terminals and clip units are electrically connected, as by connectors 62. The arrangement is such that current of the subscriber's line at the terminal lugs 25 thereof follows the clip units 58, 59 and 60, the terminals 48, 49 and 50 connected therewith, and the lines 51, 53 and 55 respectively connected to said terminals.

OPERATION

When a subscriber's line becomes inoperative for any of the reasons mentioned above, the present circuit-restoring means is installed by connecting the terminal clip to the T, R and C terminal lugs of that line, placing the unit 15 on any portion of the bay 12 that can suitably magnetically mount the same, appropriate care being taken to retain some slack in the cord 26, and inserting the plug 21 into a jack or socket provided for connecting the present means to battery and ground. Since the contacts 45 and 46 of the relay 17 are closed, the lamp 19 is in circuit through leads 44 and 47 to the plug 21. Therefore, the light is on but the relay is unoperated.

Now, the button of switch 18 is pushed, connecting the ground of said plug to the lead 39 in which the resistor 40 is provided and through said switch to the line 38, the relay coil 34, and lead 37 to the battery of said plug, thereby causing the relay to operate and lock up the line short. This is accomplished by establishing a circuit from the tip 36 to the relay winding 34, through the contacts 43 and 56 of the spring pile-up 35, out on the tip side of the line over the loop, back in on the ring side to contacts 54 and 63, through the resistor 40, and to ground on the sleeve side 64 of the plug 21. Operation of the relay causes the contacts 45 and 46 to open, thereby darkening the lamp 19. The contacts 46 and 52 are closed as a result of the relay operation, grounding the C terminal 48 through leads 51 and 47. Such grounding of the C lead holds the subscriber's line and cut-off relays operated. Now, the line-finder and associated equipment can be freed for use.

When the trouble that caused the subscriber's line to become inoperative has been corrected, as by replacing the receiver on its hook or cradlle, removing bent or otherwise stuck coins, or the like, the above short is removed, thereby restoring the relay contacts to their original positions, removing the ground from the line and cut-off relays, and clearing the line of all attachments. Now, the lamp 19 will light up, indicating that the present restoring means may be removed for use when again needed.

The above may be summarized as follows:

(1) Connect the device to central office battery, lighting the lamp 19.

(2) Close switch 18, setting the device on the subscriber's line and extinguishing said lamp.

(3) Remove the line-finder from the subscriber's line by operating the wiper to contact 65 and also darken the lamp.

(4) Hold the line and cut-off relay with controlled ground, thereby freeing the line-finder and selector for use by other subscribers.

(5) When the "permanent" is cured, the line is immediately made available to normal selection by restoring the relay to its initial out-of-use position.

(6) The lamp re-lights.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. Circuit-restoring means adapted to be mounted on the line-finder bay of central office telephone equipment and having ferrous portions, provided with terminal lugs arranged in tiers and in which each tier of terminals is connected to a subscriber's line being served by said bay, said means comprising:

(a) a unit incorporating a relay having a coil and banks of pile-up contacts, a lamp, and a D.C. circuit connecting said relay and lamp and provided with a pushbutton switch in the portion of the circuit connected to the relay, (b) magnetic means on said unit and adapted for magnetic connection with and mounting upon a ferrous portion of said bay, (c) a battery and ground plug adapted for connection to the battery and ground provided for said bay, a cord being provided to connect said plug to the D.C. circuit to provide energizing current for the relay when the switch is closed and operating current for the lamp, (d) a terminal clip provided with clip terminals adapted for clip-on connection to a tier of terminal lugs above mentioned and which is connected to a subscriber's line that has been rendered inoperative, and (e) a cord provided with leads that connect said clip terminals and the mentioned pile-up contacts, (f) the mentioned inoperative subscriber's line being locked up to the line-finders of said bay when the relay is energized and the banks of pile-up contacts are moved from non-operated to operated positions when the relay coil is energized, 2. Circuit-restoring means according to claim 1 in which the relay, lamp and circuit-incorporating unit comprises:
(a) a dielectric housing,
(b) a magnet-housing dielectric extension on the upper and lower ends of said housing, and
(c) an extension on the housing forward of the mentioned dielectric extensions and adapted for holding woundup convolutions of said cords.

3. Circuit-restoring means according to claim 2 provided with a face plate on said forward housing extension and having upper and lower portions that cooperate with the magnet-housing extensions to retain said cord convolutions on the forward extension of the housing.

4. Circuit-restoring means according to claim 2 in which the magnetic means comprises a permanent magnet housed in the extensions on the upper and lower ends of the dielectric housing, said magnets having their poles in substantially flush register with the rear face of the unit.

5. Circuit-restoring means according to claim 1 in which the terminal clip comprises:
(a) three clip terminals arranged in side-by-side relation and adapted for physical and electrical clip-on connection with three terminal lugs of either the wire-wrap or solder type, and
(b) a conductor extending from each clip terminal, the three conductors being embodied in the mentioned cord.

6. Circuit-restoring means according to claim 5 in which a dielectric body is provided to mount the clip terminals and to insulate them from each other, and conductor-connected terminals on an end of said body and electrically connected to the clip terminals.

References Cited

UNITED STATES PATENTS

| | | | |
|---|---|---|---|
| 2,506,400 | 5/1950 | Wietz | 179—146 |
| 2,520,592 | 8/1950 | Wronke | 179—175 |
| 2,650,950 | 9/1953 | Kessler | 179—18 |
| 2,771,511 | 11/1956 | Morris | 179—30 |

KATHLEEN H. CLAFFY, Primary Examiner

D. W. OLMS, Assistant Examiner